April 29, 1969  YOSHIKAZU ISOWA  3,441,579
ORGANIC IMINO COMPOUND METAL HALIDE COMPLEXES AND
PROCESS FOR PRODUCING THE SAME
Filed June 16, 1967
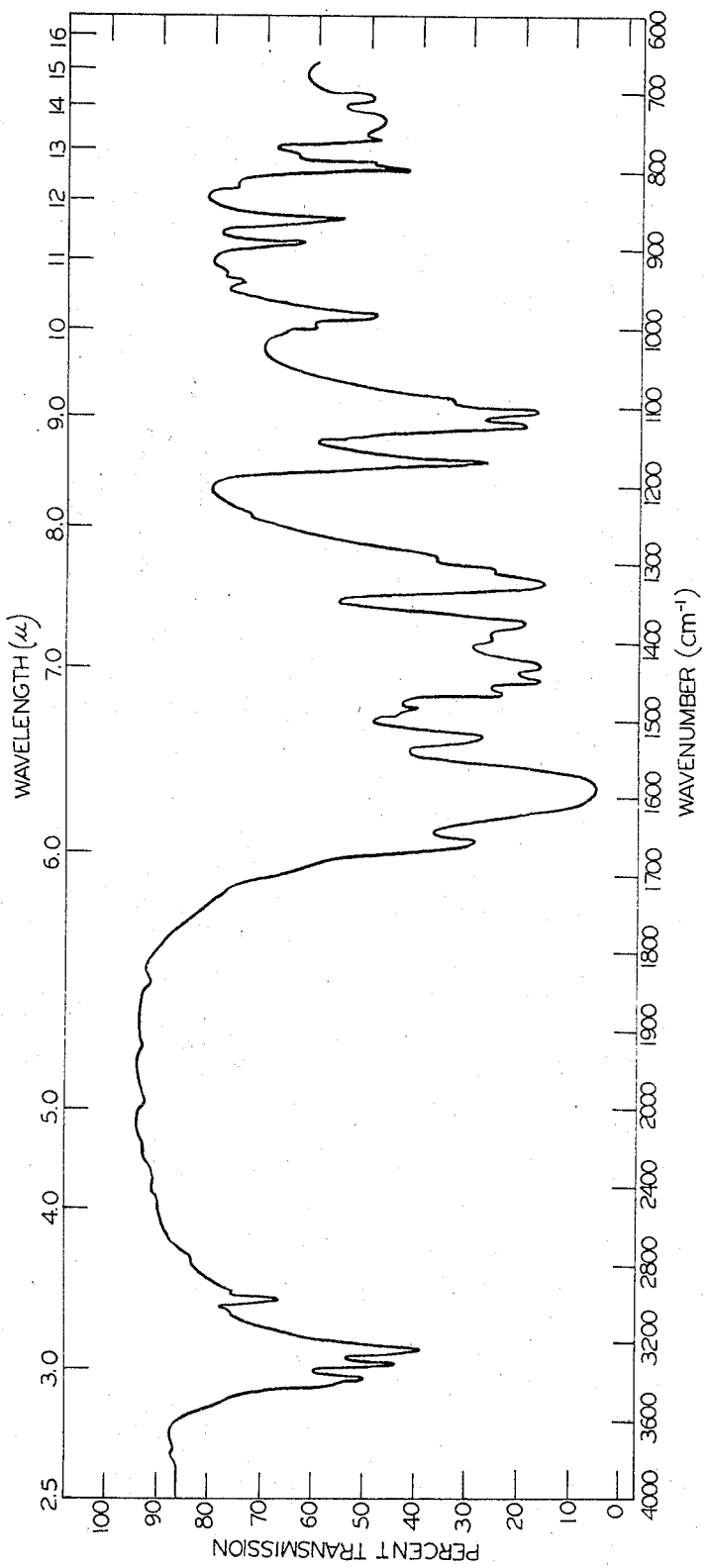
INVENTOR
YOSHIKAZU ISOWA
BY Christen, Sabol,
O'Brien & Caldwell
ATTORNEYS

United States Patent Office 3,441,579
Patented Apr. 29, 1969

3,441,579
ORGANIC IMINO COMPOUND METAL HALIDE COMPLEXES AND PROCESS FOR PRODUCING THE SAME
Yoshikazu Isowa, Tokyo, Japan, assignor to Toyo Koatsu Industries, Incorporated, Tokyo, Japan, a corporation of Japan
Filed June 16, 1967, Ser. No. 646,535
Int. Cl. C07f 7/28; C09d 5/32
U.S. Cl. 260—429.5                                  8 Claims

ABSTRACT OF THE DISCLOSURE

Novel organic imino compound metal chloride complexes produced by reacting an aliphatic or aromatic nitrile, such as, acetonitrile or benzonitrile, an active methylene compound, such as, diethyl malonate and stannic chloride or titanium tetrachloride. The complexes are useful as intermediates for plastic additives, medicines agricultural chemicals and as intermediates for the synthesis of amino and keta compounds.

---

This invention relates to novel organic imino compound-metal chloride complexes and to processes for producing same by reacting an aliphatic or aromatic nitrile and an active methylene compound in the presence of a metal chloride.

It has been well known heretofore that a nitrile produces a coordination complex with a metal halide and that an active methylene compound also produces a coordination complex with a metal halide. For example, the complex of acetonitrile with stannic chloride is known as $$(CH_3CN)_6 \cdot SnCl_4$$

the complex of benzonitrile with stannic chloride or titanium tetrachloride is known as $(C_6H_5CN)_2 \cdot SnCl_4$ or $(C_6H_5CN)_2 \cdot TiCl_4$ (Phys. Chem. Soc., 39, 102, 1907). Further, the complex of diethyl malonate with stannic chloride or stannic bromide is known as $$CH_2(COOC_2H_5)_2 \cdot SnCl_4$$

or $CH_2(COOC_2H_5)_2 \cdot SnBr_4$ (Z. anorg. Chem., 87. 341).

However, heretofore, it has not been known that when a nitrile and an active methylene compound react with each other in the presence of a metal halide an organic imino compound metal halide complex results. The resulting coordination complexes themselves also were not known heretofore.

The novel complexes of this invention are represented by the formula:

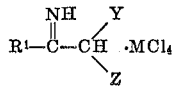

wherein $R^1$ is selected from the group consisting of alkyl and alkenyl radicals containing 1 to 20, preferably 1 to 13, carbon atoms, aralkyl radicals containing 7 to 20, preferably 7 to 12, carbon atoms, aryl radicals having 6 to 20, preferably 6 to 12 carbon atoms, substituted aryl radicals having 6 to 20, preferably 6 to 12, carbon atoms wherein said substituents are nitro, amino, halogen, $C_1$ to $C_6$ alkyl or $C_1$ to $C_6$ alkoxy groups on the aromatic nucleus, and $C_6H_5CH=CH$—, $C_6H_5CO$— and $C_6H_5COCH_2$— radicals and Y and Z are each selected from $R^2OCO$—, $R^3CO$— and $R^4NHCO$ radicals wherein $R^2$ is an alkyl radical containing 1 to 4 carbon atoms and $R^3$ and $R^4$ are each selected from alkyl radicals containing 1 to 4 carbon atoms and aryl radicals containing 6 to 20, preferably 6 to 12, carbon atoms and M is selected from tin and titanium.

This invention relates to complexes of this type and to processes for producing them by reacting an aliphatic or aromatic nitrile represented by the formula $R^1CN$ and an active methylene compound represented by the formula $Y$—$CH_2$—$Z$ in the presence of a metal chloride selected from $SnCl_4$ and $TiCl_4$.

For example, if benzonitrile and diethyl malonate are reacted with each other in the presence of a metal chloride, a diethyl benzimidoyl malonate-stannic chloride complex (or titanium tetrachloride complex) is obtained according to the following formula:

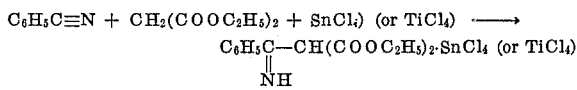

This reaction is confirmed by elementary analysis, infrared absorption spectrum and its decomposition reaction. That is to say, in the infrared asborption spectrum of the abovementioned complex, it is evident that the absorption at 2215 to 2260 cm.$^{-1}$ of the nitrile disappears and the absorption at 3205 to 3236 cm.$^{-1}$ and 1639 to 1655 cm.$^{-1}$ of an imino group newly appears.

Suitable nitriles to be used in the present invention are such saturated or unsaturated nitriles of 1 to 20 carbon atoms, as, for example, aliphatic nitriles such as acetonitrile, propionitrile, valeronitrile, tridecanenitrile and acrylonitrile, aromatic nitriles such as benzonitrile, benzyl cyanide and cinnamonitrile, benzoylacetonitrile, benzoyl cyanide and aromatic nitriles having as substituents on the aromatic nucleus, nitro, amino, halogen, alkyl ($C_1$ to $C_6$) or alkoxy ($C_1$ to $C_6$) groups, such as, for example, 3-nitrobenzonitrile;
p-nitrobenzonitrile,
3,5-dinitrobenzonitrile;
3-methylbenzyl cyanide 2-amino-p-tolunitrile;
o, m, or p-aminobenzonitrile;
p-chlorobenzonitrile;
p-bromobenzonitrile;
p-methoxybenzonitrile;
benzoyl cyanide;
benzoyl-acetonitrile.

For the active methylene compounds are adapted the alkyl malonates,
the alkyl acetoacetates,
acetyl acetone,
diethyl malonate,
dipropyl malonate,
ethyl acetoacetate,
ethyl benzoylacetate,
acetoacetanilide,
dibenzoylmethane,
benzoyl acetone,
2,4-pentanedione,
N,N'-diethylmalonamide,
N,N'-diphenylmalonamide,
butyl 2-benzoylacetate,
diproprionyl-methane,
N-ethyl-N'-phenylmalonamide,
2-butyryl-N-methyl-acetamide,
2-benzoyl-N-phenylacetamide,
2-acetyl-N-phenylacetamide,
ethyl N-methylamido malonate,
butyl N-phenylamido malonate and
the like.

The reaction will proceed moderately in no solvent or in an organic solvent such as benzene, toluene and chloroform. Substantially no by-product will be produced. Further, in the process of the present invention, the yield is high and, with a nitrile of a simple composition, the reaction will proceed substantially quantitatively. It is a safe process and advantageously adapted to industrialization.

In the general operation of the present invention, equal mols of stannic chloride or titanium tetrachloride while kept at 0 to 70° C. are dropped into a mixture of equal mols of a nitrile and an active methylene compound and then the reaction mixture is heated at 70 to 120° C. for several minutes to complete the reaction. An excess of any of the reactants can be employed without any significant advantage. When the reaction product is washed with cold chloroform, the complex of the present invention can be recovered.

The complex obtained by the present invention is a novel compound useful as intermediates for plastics additives, medicines, agricultural chemicals, etc., and as intermediates for the synthesis of amino compounds and keto compounds. In particular, the novel complexes are particularly useful in the manufacture of imino compounds by decomposition through contact with water or alkanol as described in my copending application filed concurrently herewith. Such imino compounds are useful as ultraviolet light absorbers for use in paints, varnishes, opaque or transparent plastics, sun-tan lotions and the like wherein it is desired to prevent transmission of ultraviolet light. The process of the present invention is valuable as a method of utilizing nitrile compounds.

The following examples are presented:

EXAMPLE 1

13 g. of stannic chloride were dropped, at a temperature in the range of 30 to 60° C. under stirring, into a mixture of 5 g. of benzonitrile and 8 g. of diethyl malonate. The mixture became light yellow and gradually increased in viscosity. After being left to cool, it was warmed to 100 to 120° C. and was kept at this temperature for 5 minutes. The mixture was then left to cool and solidify. It was washed with chloroform, and 23.1 g. of light yellowish white crystals of diethyl benzimidoyl malonate-stannic chloride complex were obtained. Its infrared absorption spectrum is shown in FIG. 1.

The elementary analysis values of the product, $$C_6H_5C(=NH)CH(COOC_2H_5)_2 \cdot SnCl_4$$

as $C_{14}H_{17}NO_4 \cdot SnCl_4$ were as follows: Calcd.—C, 32.6; H, 3.71; N, 2.71; Cl, 27.50. Found: C, 31.83; H, 3.46; N, 2.66; Cl, 27.38.

EXAMPLE 2

52 g. of stannic chloride were dropped, at a temperature in the range of 30 to 60° C. under stirring, into a mixture of 8.2 g. of acetonitrile and 32 g. of diethyl malonate. After the completion of the dropping, crystals were deposited. The crystals were left standing overnight, were then warmed on a water bath for 1 hour, were left to cool, were washed with chloroform and were then dried. 39 g. of white crystals of diethyl acetimidoyl malonate-stannic chloride complex were obtained.

The elementary analysis values of the product, $$CH_3C(=NH)CH(COOC_2H_5)_2 \cdot SnCl_4$$

as $C_9H_{15}O_4N \cdot SnCl_4$ were as follows: Calcd.—C, 23.41; H, 3.27; N, 3.03; Cl, 30.72. Found: C, 22.89; H, 3.56; N, 3.03; Cl, 30.89.

EXAMPLE 3

26 g. of stannic chloride were dropped, at a temperature in the range of 30 to 60° C. under stirring, into a mixture of 5.5 g. of propionitrile and 16 g. of diethyl malonate. The stirring was continued for 1 hour after the completion of the dropping and the mixture was left standing overnight, crystals were deposited. The crystals were washed with ether and were dried. 44 g. of white crystals of diethyl propionimidoyl malonate-stannic chloride complex were obtained.

The elementary analysis values of the product, $$C_2H_5C(=NH)CH(COOC_2H_5)_2 \cdot SnCl_4$$

as $C_{10}H_{17}O_4N \cdot SnCl_4$ were as follows: Calcd.—C, 25.24; H, 3.60; N, 2.94; Cl, 29.81. Found: C, 24.55; H, 3.72; N, 2.86; Cl, 29.59.

EXAMPLE 4

52 g. of stannic chloride were dropped, at a temperature in the range of 30 to 60° C. under stirring, into a mixture of 16.6 g. of valeronitrile and 32 g. of diethyl malonate. The mixture was warmed at 100 to 110° C. for 1 hour after the completion of the dropping and was left standing overnight. It crystallized. The crystals were washed with ether and were dried. 99 g. of a diethyl valerimidoyl malonate-stannic chloride complex were obtained.

The elementary analysis values of the product, $$CH_3(CH_2)_3C(=NH) \cdot CH(COOC_2H_5)_2 SnCl_4$$

as $C_{12}H_{21}O_4N \cdot SnCl_4$ were as follows: Calcd.—C, 28.61; H, 4.20; N, 2.78; Cl, 28.15. Found: C, 28.11; H, 4.10; N, 2.58; Cl, 28.47.

EXAMPLE 5

26 g. of stannic chloride were dropped, at a temperature in the range of 30 to 60° C. under stirring, into a mixture of 8.3 g. of valeronitrile and 13 g. of ethyl acetoacetate, and soon crystals were deposited. The mixture was warmed on a water bath after the completion of the dropping to perfectly crystallize. The crystals were left standing overnight, were then washed with chloroform and were dried. 45.5 g. of white crystals of ethyl valerimidoyl acetoacetate-stannic chloride complex were obtained.

The elementary analysis values of the product, $$CH_3(CH_2)_3C(=NH) \cdot CH(COCH_3)COOC_2H_5 \cdot SnCl_4$$

as $C_{11}H_{19}O_3N \cdot SnCl_4$ were as follows: Calcd.—C, 27.88; H, 4.04; N, 2.95; Cl, 29.94. Found: C, 27.74; H, 4.04; N, 2.87; Cl, 30.02.

EXAMPLE 6

26 g. of stannic chloride were dropped, at a temperature in the range of 30 to 60° C. under stirring, into a mixture of 10.3 g. of benzonitrile and 13 g. of ethyl acetoacetate. The mixture was warmed on a water bath for 1 hour after the completion of the dropping and was left standing overnight and then the deposited crystals were washed with chloroform. 46 g. of white crystals of ethyl benzimidoyl acetoacetate-stannic chloride complex were obtained.

The elementary analysis values of the product, $$C_6H_5C(=NH)CH(COCH_3)COOC_2H_5 \cdot SnCl_4$$

as $C_{13}H_{15}O_3N \cdot SnCl_4$ were as follows: Calcd.—C, 31.61; H, 3.06; N, 2.83; Cl, 28.72. Found: C, 31.42; H, 3.13; N, 2.68; Cl, 29.02, 28.78.

EXAMPLE 7

75 g. of stannic chloride were dropped while kept below 60° C. into a mixture of 37 g. of cinnamonitrile and 46 g. of diethyl malonate. The mixture was heated at 100 to 120° C. for 5 minutes after the dropping and was left to cool. The deposited crystals were washed with chloroform. 102 g. of diethyl cinnamimidoyl malonate-stannic chloride complex were obtained. Its melting point was 194 to 195° C. (decomposed).

The elementary analysis values of the product, $$C_6H_5CH=CHC(=NH)CH(COOC_2H_5)_2 \cdot SnCl_4$$

as $C_{16}H_{19}NO_4 \cdot SnCl_4$ were as follows: Calcd.— C, 34.94; H, 3.48; N, 2.55; Cl, 25.77. Found: C, 34.73; H, 3.58; N, 2.40; Cl, 25.65.

EXAMPLE 8

26 g. of stannic chloride were dropped, at a temperature in the range of 30 to 60° C., into a mixture of 19.5 g. of tridecanenitrile and 16 g. of diethyl malonate. After the completion of the dropping, the mixture was heated at 90 to 110° C. for 30 minutes and was left to cool. The reaction product was diethyl tridecanimidoyl malonate-stannic chloride complex in the form of a syrup, $$CH_3(CH_2)_{11}C(=NH)CH(COOC_2H_5)_2 \cdot SnCl_4$$

EXAMPLE 9

9.5 g. of titanium tetrachloride were dropped at a temperature in the range of 30 to 60° C. under stirring into a mixture of 5 g. of benzonitrile and 8 g. of diethyl malonate and the mixture was left to cool. The mixture was heated at 100 to 120° C. for 5 minutes and was left to cool. The mixture was warmed at 80 to 100° C. under a reduced pressure (of 5 mm. Hg) for 2 hours and was then left to cool. 22.1 g. of an orange crystalline solid of diethyl benzimidoyl malonate-titanium tetrachloride complex were obtained, $$C_6H_5C(=NH)CH(COOC_2H_5)_2 \cdot TiCl_4$$

EXAMPLE 10

5.2 g. of stannic chloride were dropped while kept at 0 to 4° C. into a mixture of 10.6% g. of acrylonitrile and 32 g. of diethyl malonate. White crystals were deposited during the dropping. After the completion of the dropping, the stirring was continued at room temperature for 1 hour. The mixture was then warmed until the internal temperature rose to 70° C., and then the reaction mixture became light yellow. The product was left standing overnight and was then washed with chloroform. 91 g. of white crystals of diethyl acrylimidoyl malonate-stannic chloride complex were obtained.

The elementary analysis values of the product, $$CH_2=CH \cdot C(=NH)CH \cdot (COOC_2H_5)_2 \cdot SnCl_4$$

as $C_{10}H_{15}O_4N \cdot SnCl_4$ were as follows: Calcd.—C, 2.96, Cl, 29.94. Found: C, 2.55; Cl, 29.89.

EXAMPLE 11

100 cc. of chloroform were added to 19.3 g. of 3,5-dinitrobenzonitrile and 16 g. of diethyl malonate, and 26 g. of stannic chloride were dropped at a temperature in the range of 30 to 60° C. under stirring into the mixture. After the completion of the dropping, the mixture was heated and refluxed for 1 to 1.5 hours. White crystals came to be deposited. The crystals were left standing overnight, were separated by filtration, were washed with chloroform and were then dried. 61 g. of diethyl 3,5-dinitrobenzimidoyl malonate-stannic chloride complex were obtained.

The elementary analysis values of the product, $$C_6H_3(NO_2)_2C(=NH)CH(COOC_2H_5)_2 \cdot SnCl_4$$

as $C_{14}H_{15}O_8N_3 \cdot SnCl_4$ were as follows: Calcd.—C, 27.39; H, 2.46; N, 6.85; Cl, 23.11. Found: C, 27.25; H, 2.38; N, 6.82; Cl, 23.08.

EXAMPLES 12–20

The following complexes (column D) are made from the reactions of specific nitriles (column A), active methylene compounds (column B) and stannic chloride or titanium tetrachloride (column C) in a manner similar to that given in Examples 1 to 11.

| Ex. | A Nitriles | B Active Methylene Compounds | C $MCl_4$ | D Products |
|---|---|---|---|---|
| 12 | $CH_3CH_2CH_2CN$ | $CH_2(COCH_3)_2$ | $SnCl_4$ | $CH_3CH_2CH_2C(=NH)CH(COCH_3)_2 \cdot SnCl_4$ |
| 13 | $C_6H_5CN$ | $CH_2(COCH_3)_2$ | $SnCl_4$ | $C_6H_5C(=NH)CH(COCH_3)_2 \cdot SnCl_4$ |
| 14 | $C_6H_5CN$ | $CH_2(COCH_3)_2$ | $TiCl_4$ | $C_6H_5C(=NH)CH(COCH_3)_2 \cdot TiCl_4$ |
| 15 | $C_6H_5CN$ | $CH_2(COC_6H_5)(COOC_2H_5)$ | $SnCl_4$ | $C_6H_5C(=NH)CH(COC_6H_5)(COOC_2H_5) \cdot SnCl_4$ |
| 16 | $C_6H_5CN$ | $CH_2(COC_6H_5)(COOC_2H_5)$ | $TiCl_4$ | $C_6H_5C(=NH)CH(COC_6H_5)(COOC_2H_5) \cdot TiCl_4$ |
| 17 | $C_6H_5CN$ | $CH_2(COCH_3)(CONHC_6H_5)$ | $SnCl_4$ | $C_6H_5C(=NH)CH(COCH_3)(CONHC_6H_5) \cdot SnCl_4$ |
| 18 | $C_6H_5CN$ | $CH_2(COCH_3)(CONHCH(CH_3)_2)$ | $SnCl_4$ | $C_6H_5C(=NH)CH(COCH_3)(CONHCH(CH_3)_2) \cdot SnCl_4$ |
| 19 | $C_6H_5COCN$ | $CH_2(COOC_2H_5)_2$ | $SnCl_4$ | $C_6H_5COC(=NH)CH(COOC_2H_5)_2 \cdot SnCl_4$ |
| 20 | $C_6H_5COCH_2CN$ | $CH_2(COOC_2H_5)_2$ | $SnCl_4$ | $C_6H_5COCH_2C(=NH)CH(COOC_2H_5)_2 \cdot SnCl_4$ |
| 21 | $O_2NC_6H_4CN$ | $CH_2(COOC_2H_5)_2$ | $SnCl_4$ | $O_2NC_6H_4C(=NH)CH(COOC_2H_5)_2 \cdot SnCl_4$ |

| Ex. | A Nitriles | B Active Methylene Compounds | C MCl₄ | D Products |
|---|---|---|---|---|
| 22 | $C_6H_5CN$ | $CH_2(COOC_2H_5)_2$ | $TiCl_4$ | $C_6H_5\overset{NH}{\overset{\|}{C}}CH(COOC_2H_5)_2 \cdot TiCl_4$ |
| 23 | $CH_3CN$ | $CH_2\diagdown^{COCH_3}_{COOC_2H_5}$ | $SnCl_4$ | $CH_3\overset{NH}{\overset{\|}{C}}CH\diagdown^{COCH_3}_{COOC_2H_5} \cdot SnCl_4$ |
| 24 | $C_6H_5CN$ | $CH_2\diagdown^{COCH_3}_{COOC_2H_5}$ | $TiCl_4$ | $C_6H_5\overset{NH}{\overset{\|}{C}}CH\diagdown^{COCH_3}_{COOC_2H_5} \cdot TiCl_4$ |

The following description illustrates the effect of some of the products of this invention to improve the light stability of polyvinyl chloride compositions.

Compositions are prepared by mixing 100 parts of polyvinyl chloride with 50 parts of di-octylphthalate and 2 parts of barium-cadmium laurate and with or without 2 parts of one of the compounds set forth below on rollers at a roll temperature of 150 to 160° C. to form a homogeneous composition which is removed from the roll in crude sheets. From the milled composition, finished sheets are molded which are about 0.5 mm. in thickness. The compounds used are ethyl benzimidoylacetoacetate, ethyl benzimidoylbenzoylacetate and diethyl cinnamimidoylmalonate.

After weatherometer exposure for 50 hours, the specimens without the compounds set forth above are discolored from colorless to orange, but the specimens with the compounds are remained unchanged. Thus, articles made from polyvinyl chloride containing the novel compounds, such as building panels, storm window panes, packaging films, bottles and the like, do not discolor upon exposure to light.

What is claimed is:

1. Organic imino compound metal chloride complex having the formula:

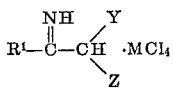

wherein R¹ is a radical selected from a group consisting of alkyl and alkenyl radicals containing 1 to 20 carbon atoms, aryl radicals containing 6 to 20 carbon atoms, aralkyl radicals containing 7 to 20 carbon atoms, substituted aryl radicals having 6 to 20, preferably 6 to 12, carbon atoms wherein said substituents are selected from the group consisting of nitro, amino, halogen, $C_1$ to $C_6$ alkyl, and $C_1$ to $C_6$ alkoxy groups on the aromatic nucleus, $C_6H_5CH=CH-$, $C_6H_5CO-$ and $C_6H_5COH_2-$ radicals and Y and Z are radicals each selected from $R^2OCO-$, $R^3CO-$ and $R^4NHCO-$ radicals wherein $R^2$ is an alkyl radical containing 1 to 4 carbon atoms and $R^3$ and $R^4$ are each selected from alkyl radicals containing 1 to 4 carbon atoms and aryl radicals containing 6 to 20 carbon atoms, and M is selected from tin and titanium.

2. Organic imino compound metal halide complex as claimed in claim 1 wherein said complex is selected from the group consisting of diethyl benzimidoylmalonate·stannic chloride complex; diethyl acetimidoylmalonate·stannic chloride complex; diethyl propionimidoylmalonate·stannic chloride complex; diethyl valerimidoylmalonate·stannic chloride complex; ethyl valerimidoylacetoacetate·stannic chloride complex; ethyl benzimidoylacetoacetate·stannic chloride complex; diethyl cinnamimidoylmalonate·stannic chloride complex; diethyl tridecanimidoylmalonate·stannic chloride complex; diethyl benzimidoylmalonate·titanium tetrachloride complex; diethyl acrylimidoylmalonate·stannic chloride complex; diethyl 3,5-dinitrobenzimidoylmalonate·stannic chloride complex; propionimidoylacetylacetone·stannic chloride complex; benzimidoylacetylacetone·stannic chloride complex; benzimidoylacetylacetone·titanium tetrachloride complex; ethyl benzimidoylbenzoylacetate·stannic chloride complex; ethyl benzimidoylbenzoylacetate·titanium tetrachloride complex; benzimidoylacetoacetanilide·stannic chloride complex; N-isopropylbenzimidoylacetoacetamide·stannic chloride complex; diethyl benzoylformimidoylmalonate·stannic chloride complex and diethyl benzoylacetimidoyl·malonate·stannic chloride complex.

3. A process for producing organic imino compound metal halide complexes as claimed in claim 1 which comprises reacting nitrile represented by the formula R′CN and an active methylene compound represented by the formula $Y-CH_2-Z$ in the presence of a metal halide represented by the formula $MCl_4$, wherein R′, Y and Z are as defined in claim 1.

4. A process as claimed in claim 3 wherein said metal chloride is added to the mixture of said nitrile and said active methylene compound at a temperature in the range of 0 to 70° C.

5. A process as claimed in claim 4 wherein after the addition of said metal chloride, the reaction mixture is heated at a temperature in the range of 70–120° C.

6. A process as claimed in claim 3 wherein said reaction is conducted in an organic solvent.

7. A process as claimed in claim 3 wherein said metal chloride is stannic chloride.

8. A process as claimed in claim 3 wherein said metal chloride is titanium tetrachloride.

References Cited

UNITED STATES PATENTS

| | | | |
|---|---|---|---|
| 2,278,965 | 4/1942 | Ceski et al. | 260—429.7 XR |
| 2,465,296 | 3/1949 | Swiss. | |
| 3,373,177 | 3/1968 | Young | 260—429.7 XR |

TOBIAS E. LEVOW, *Primary Examiner.*

H. M. S. SNEED, *Assistant Examiner.*

U.S. Cl. X.R.

260—999; 106—15; 71—97